Patented Nov. 5, 1935

2,019,542

UNITED STATES PATENT OFFICE 2,019,542

SILICEOUS REFRACTORY

John M. McKinley, East Cleveland, and Willard K. Carter, Columbus, Ohio; said Carter assignor to National Aluminate Corporation, Chicago, Ill., a corporation of Delaware, and said McKinley assignor to North American Refractories Company, Cleveland, Ohio, a corporation of Delaware No Drawing. Application June 7, 1934, Serial No. 729,532

5 Claims. (Cl. 106—9)

The present invention relates to an improvement in the manufacture of siliceous refractories.

One of the objects of the present invention is to produce, from siliceous raw materials, such as ganister and its equivalents, highly heat-resistant refractory articles of the general nature of bricks of the type used for furnace linings and the like.

The novelty in the present invention resides in the use of certain definite types of barium compounds to form the binding-agent that serves to bind the siliceous particles together. There is also strong reason to believe that the presence of these barium compounds exerts a beneficial action on the siliceous particles themselves, for the finished products are very much less subject to spalling and cracking than are similar articles made from the same kind of siliceous raw material but with the use of lime compounds as a bond. It should be pointed out that in the present invention barium compounds of a certain type are substituted for calcium compounds. While it might first be believed that barium is the chemical equivalent of calcium and that hence no unexpected results would follow from the use of barium compounds for this purpose, quite the contrary is the fact.

The inventors have definitely established that the greatly improved qualities of the products made by the practice of their invention can not be accounted for by the known properties of the barium compounds, and that it is highly probable that barium behaves, in the presence of silica and at high temperatures, quite unlike calcium.

The elements barium and calcium belong to the same "group of elements" according to the teachings of the Mendeleeff theory; but the two elements, although they display considerable similarity as to the type of compounds that they are capable of forming and certain similarities as to valency and color of compounds, are nevertheless quite chemically distinct and endowed with individual properties that show that, fundamentally, they are quite different and by no means the equivalents of each other, particularly when employed in the siliceous refractory art.

In order to call to mind some of the outstanding differences between the compounds of barium and of calcium, there is herewith given a table of properties of certain of the compounds which shows how widely these materials differ:

|           | Barium                                | Calcium                                         |
|-----------|---------------------------------------|-------------------------------------------------|
| Carbonate | Highly poisonous                      | Harmless.                                       |
| Sulfate   | Harmless, inert, insoluble.           | Poisonous if taken internally, somewhat soluble.|
| Aluminate | Water-soluble                         | Water-insoluble.                                |
| Chloride  | Soluble, poisonous                    | Very deliquescent, non-poisonous.               |
| Hydroxide | Corrosive, strongly alkaline, poisonous. | Non-corrosive, harmless.                     |

Thus, in some cases the barium compound is poisonous, and in other cases it is the calcium compound that is poisonous. Many other examples could be given, but it is believed that the point is clear.

In a pending patent application of the same inventors, Serial No. 690,882, filed September 25, 1933, the preparation of siliceous refractories is described. Barium aluminate is the main bonding ingredient therein disclosed and claimed. The same inventors, by continuing their researches, have now made the further discovery that other compounds of barium, and particularly the kinds that tend to form barium oxide when subjected to high temperatures, are capable of either uniting with, or in some way bonding themselves to, silica and siliceous matter in such a manner as to produce highly heat-resistant refractories of very valuable properties.

The particular barium compounds which have been found to yield satisfactory results are acetate, hydroxide, nitrate, peroxide, and carbonate. Equivalents of the acetate, such as formate, oxalate, propionate or similar organic salts, are also to be considered as within the group of compounds contemplated as being within the scope of the present invention. Barium oxide itself may also be used, although it will first form the hydroxide on being mixed with water in the process. The term "barium compound capable of yielding barium oxide when subjected to ceramic-firing temperatures," used in the subjoined claims, is to be considered as including the above-enumerated compounds.

The process of manufacturing siliceous refractory ware by practicing the present invention is comparatively simple and consists, in essence, in incorporating from ½ to 10% of the desired barium compound with the siliceous material, followed by molding, drying and firing, as will be further discussed hereinbelow.

Good results are obtained by employing a quantity of the barium compound which, when calculated as barium oxide, would correspond to about 1.25% of barium oxide on the weight of the siliceous material used. When using a water-soluble barium compound, the same is dissolved in water, either hot or cold, and the resulting solution is mixed in a wet-pan with preground siliceous matter, as for example ganister. The damp mixture thus resulting is then molded, as by hammering into a mold, or by any equivalent molding method, dried and fired to about cone 19 (2768° F.) in the regular standard commercial firing-kilns used for such purposes. When using barium carbonate, which is insoluble in water, the same is suspended in water and the suspension used as though it were a solution. In the claims, the term "dispersion" includes either a solution or suspension.

As a specific example of an actual commercial batch, the following may be cited: 1400 lbs. of ganister having a screen-analysis as reproduced below, 23.7 lbs. of precipitated barium carbonate, and 140.0 lbs. of water.

This mixture was ground in a wet-pan for 27 minutes to a 12 min. grain size. After molding and drying for 24 hours at 300° F., the articles were fired for a period of ten days to reach a maximum temperature of about 2700° F., held for 48 hours at this temperature, and then gradually cooled to atmospheric temperatures in ten days. The properties of the fired articles produced as above outlined were as follows:

Specific gravity _____ 2.277
Density _____ 1.608
P. C. E. (pyrometric cone equivalent)_ 32 to 33

The products are characterized by greatly enhanced resistance to terminal shock, increased P. C. E. value, and particularly by the formation of what appears to be an isotropic compound, somewhat like a high viscosity barium glass, or the like, which produces a substantially continuous bond between the ganister particles. This barium compound also promotes a type of silica transformation or inversion at high temperatures that results in greater homogeneity of the crystal structure of the individual unfused siliceous particles, instead of the graded areas of inversion usually obtained when lime is used as the bonding-agent.

The most outstanding characteristic, however, and the quite unexpected result flowing from the use of barium compounds instead of lime, is the remarkable increase in resistance to spalling; in fact, the spalling losses when practicing the present invention are only a small fraction as compared with those of refractories made from the identical raw material but with the use of a lime bond. The spalling test employed consisted in twelve series of alternate heatings and coolings to 1000° C. in the manner described in vol. 14, No. 5, May, 1931, of the Journal of the American Ceramic Society in an article entitled "A Service Spalling Test for Refractories". As described on page 391 of this publication, the spalling test consisted of heating the surface of a panel of the material being tested to 1000° C. and then cooling by an air-blast, using ten-minute intervals between reversals. After heating and cooling twelve times (twelve cycles), the panels were dismantled and loose fragments produced by spalling were removed. The index to spalling was reported as the percentage average weight loss.

Refractories made from ganister bonded with lime, in two series of tests, showed a spalling loss of 19.5% and 15.4%, while in the case of refractories bonded by means of barium in accordance with the present invention the average loss was only 2.3%. Furthermore, the shrinkage in the case of lime-bonded material was 0.4%, while the barium-bonded material showed no volumetric changes. It will be at once apparent that a most remarkable improvement has thus been brought about by the use of the barium in place of the lime.

The screen analysis of the ganister used was as follows:

| Mesh per inch | Per cent retained | Per cent through |
|---|---|---|
| 3 | ---------- | 100.0 |
| 4 | .2 | 99.8 |
| 6 | 5.0 | 94.8 |
| 8 | 10.4 | 84.4 |
| 10 | 7.9 | 76.5 |
| 14 | 4.9 | 71.6 |
| 20 | 3.0 | 68.6 |
| 28 | 2.9 | 65.7 |
| 35 | 4.3 | 61.4 |
| 48 | 6.5 | 54.9 |
| 65 | 9.9 | 45.0 |
| 100 | 9.5 | 35.5 |
| 150 | 6.2 | 29.3 |
| 200 | 4.3 | 25.0 |
| ---------- | 25.0 | ---------- |

When carrying out tests with the other barium compounds, the following results were obtained:

| | Fired properties | | |
|---|---|---|---|
| | Sp. gr. | Density | P. C. E. |
| Acetate | 2.297 | 1.605 | 32 |
| Hydroxide | 2.293 | 1.578 | 32 |
| Nitrate | 2.297 | 1.657 | 32-33 |
| Peroxide | 2.296 | 1.582 | 32-33 |
| Carbonate | 2.297 | 1.617 | 32 |

It has been shown by actual large-scale commercial practice that the new siliceous refractories, bonded by means of barium, are much more durable and last far longer than do lime-bonded materials of the same type; in fact, it may be stated that users have responded enthusiastically to these new silica refractories and that they are beginning to replace lime-bonded materials for high-temperature furnace linings and the like.

It is understood that in defining the term "refractory" it is intended to cover fired ceramic ware having a pyrometric cone equivalent (P. C. E.) value of at least cone 28. Ware having a P. C. E. value lower than cone 28 is not considered as sufficiently refractory to meet the service requirements usual to silica refractory installations and hence cannot be considered as "refractories" in the proper sense of the word. Furthermore, refractories made from clay and its equivalents are also to be excluded from the scope of the present invention. Acknowledgment is made of the fact that various kinds of soluble barium compounds have been employed in the past in ceramic ware of the clay type for the purpose of precipitating soluble sulfates, such as calcium sulfate, for the avowed purpose of preventing scumming; but it is not believed that barium compounds that are capable of producing barium oxide on firing have ever been used as the sole, or practically sole, bonding medium for siliceous particles. No claim is laid in the present application to the use of barium compounds in general, that is to say, such barium compounds as will not yield barium oxide on firing. For example, it is intended to exclude barium aluminate, barium silicate, barium stannate, barium zincate or the like. Barium compounds, however, such as the sulfide and sulfite, which yield barium oxide on firing, are to be included. The quantities range from about ½ to 10%, with the preferred amounts around 1.25 to 2.0%, calculated as barium oxide.

In the hereunto appended claims, the term "ganister" is intended to include all highly siliceous materials which are known to be the equivalents of ganister, as already mentioned among the objects of the invention. Thus raw materials which are substantially silica ($SiO_2$) are to be construed as equivalents of ganister.

What is claimed for the present invention is:—

1. The process of making refractories which comprises mixing ganister particles with an aqueous dispersion of a barium compound from the group consisting of acetate, hydroxide, nitrate, peroxide and carbonate, molding the mixture into shape, drying the shapes, and firing the same.

2. The process of making refractories which comprises mixing ganister particles with an aqueous dispersion of a barium compound from the group consisting of acetate, hydroxide, nitrate, peroxide and carbonate in amounts from ½ to 10% on the weight of the siliceous particles used, molding the resulting mixture into shape, drying the shapes, and firing the same.

3. The process of making refractories which comprises mixing ganister particles with an aqueous dispersion of a barium compound capable of yielding barium oxide when heated to not exceeding about 2750° F., molding the resulting mixture into shape, drying the shapes, and firing the same.

4. Siliceous refractories comprising ganister particles bonded by the fired decomposition product of a barium compound from the group consisting of acetate, hydroxide, nitrate, peroxide, and carbonate.

5. Refractory brick consisting of ganister particles bonded by fired barium carbonate.

JOHN M. McKINLEY.
WILLARD K. CARTER.